United States Patent [19]
Meitinger

[11] 3,893,288
[45] July 8, 1975

[54] BALANCE OF WATCHES AND METHOD OF ITS MANUFACTURE

[75] Inventor: Heinz Meitinger, Mutlangen, Germany

[73] Assignee: Bifora-Uhren J. Bidlingmaier GmbH, Schwabisch Gmund, Germany

[22] Filed: Jan. 2, 1974

[21] Appl. No.: 429,583

[30] Foreign Application Priority Data
Jan. 20, 1973 Germany............................ 2302883

[52] U.S. Cl................... 58/28 B; 58/107; 331/154
[51] Int. Cl............................ G04c 3/04; H03b 5/30
[58] Field of Search................. 58/28 A, 28 B, 107; 310/36; 331/154

[56] References Cited
UNITED STATES PATENTS

| | | | |
|---|---|---|---|
| 3,056,253 | 10/1962 | Beyner et al........................ | 58/28 A |
| 3,491,530 | 1/1970 | Tilse................................. | 58/28 R |
| 3,548,586 | 12/1970 | Klinck............................... | 58/28 A |

*Primary Examiner*—Edith Simmons Jackmon
*Attorney, Agent, or Firm*—Parmelee, Miller, Welsh & Kratz

[57] ABSTRACT

A watch balance assembly particularly suited for electrically driven watches and in which the balance carries coils contributing to the balance inertia with relatively great tolerances, a method for manufacture is suggested in which the balance comprises a shaft, an electrically insulating hub carrying the coils, and a metallic peripheral ring shrunk on to said hub and forming the junction of coil terminals clamped between the hub and the ring during the shrinking, the tolerances of the coils being compensated by removal of mass from said ring so as to inertia-balance the whole assembly with respect to said shaft.

7 Claims, 4 Drawing Figures

PATENTED JUL 8 1975 3,893,288

SHEET 1

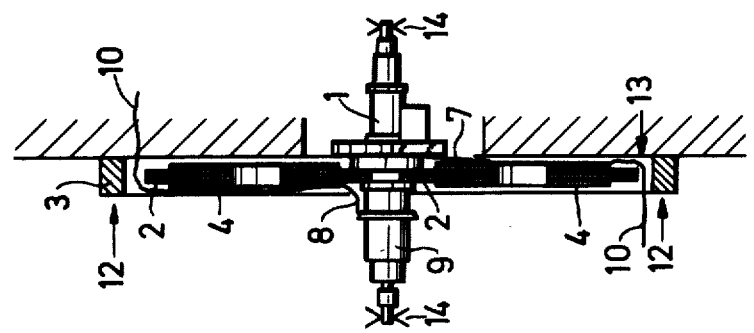
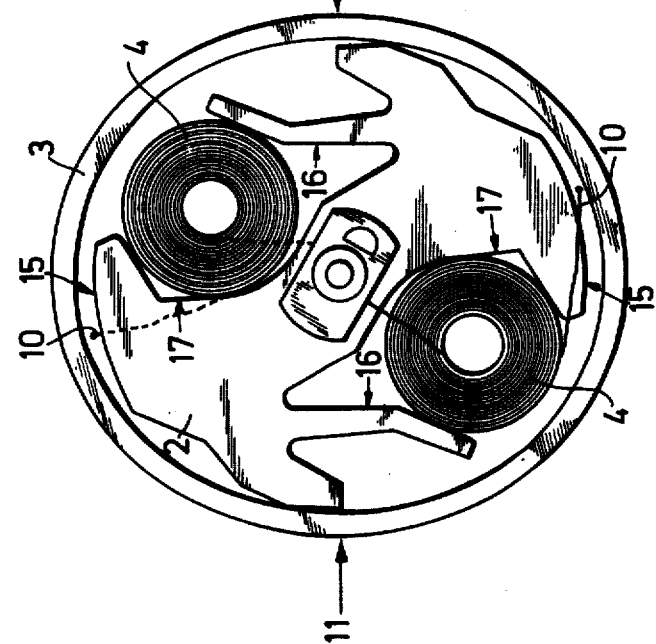

BALANCE OF WATCHES AND METHOD OF ITS MANUFACTURE

BACKGROUND OF THE INVENTION

The invention concerns a balance assembly for watches and a method of its manufacture. The invention concerns particularly a balance assembly for electrically driven watches in which the drive forces are generated by magnetic interaction between stationary elements and elements mounted on the balance.

These elements, in general permanent magnets or coils, have a considerable mass which differ from unit to unit due to the tolerances of manufacture. When balancing the balance these tolerances must be compensated for. In accordance with one known method the moment of inertia is varied by radial shifting or bending of balance body portions. According to another method the balance is first manufactured with too high a moment of inertia, the balancing later being provided by removal of mass. It will be appreciated that the latter method is advantageous and preferable therefore because it is more adapted to automatization. For this purpose a mass body is mounted on the balance and the removal of mass is made on said body.

It is an object of the present invention to provide a balance assembly for portable small watches whereby the same may be balanced by the removal of mass from a mass body and in which the mounting of said mass body, in spite of an annular shape of the latter, is particularly simple and inexpensive in manufacture. The annular shape of the mass body is preferable because it permits the mass removal at each point of the periphery wherever it may be desired.

BRIEF DESCRIPTION OF THE INVENTION

This problem is solved in accordance with the invention by shrinking an annulus to a hub member connected to the balance shaft, the balancing of the moment of inertia being provided by mass removal on said annulus.

In the case of electrically driven balances, the hub member will be manufactured of electrically insulating and/or non-magnetic material, and for reasons of economy a heat-settable plastic material is preferred, in order not to interfere with the driving interaction referred to above. The mounting of the magnetically effective elements on the balance body may take place in that these elements are clamped by resilient portions of the hub body to abutting surfaces provided thereon, the elements being secured by means of glue.

If the balance carries several coils to be connected in series it is advantageous to use the annulus not only for the balancing procedure as explained above, but also as an electrical junction between the coil wire terminals, the wire ends from each coil being positioned beneath the annulus prior to the latter being shrunk on the hub body.

When manufacturing the balance the following procedure is preferred: At first the annulus is elastically deformed by subjecting it to radially acting forces, so as to provide a noncircular shape of the annulus which is complementary to the circumferential shape of the hub which in turn is non-circular also. Thereafter the hub with the balance shaft mounted therein is inserted into the interior of the deformed annulus and, after aligning the shaft in a position perpendicular to the support face of the annulus, the shaft is blocked in said position and the forces which deformed the annulus so far are removed so that the annulus is shrunk on the hub.

The invention is described hereunder with reference to the attached drawings which illustrate a preferred embodiment of the invention.

BRIEF DESCRIPTION OF THE DRAWINGS

FIGS. 3 and 4 illustrate in analogous manner to FIGS. 1 and 2 respectively the positions of the individual balance components during manufacture.

DESCRIPTION OF A PREFERRED EMBODIMENT

Figure 2:
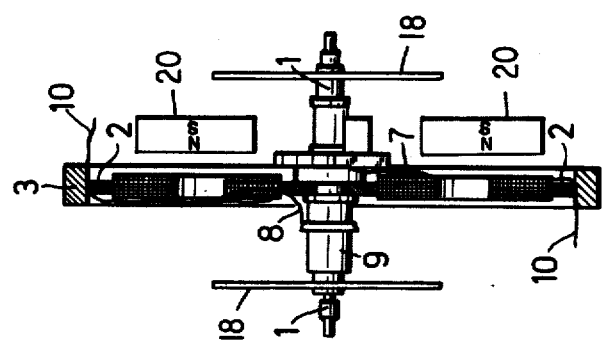
FIG. 2 is a longitudinal section through the balance shown in FIG. 1, the section being in the plane of the axis of balance shaft and coils.
Figure 1:
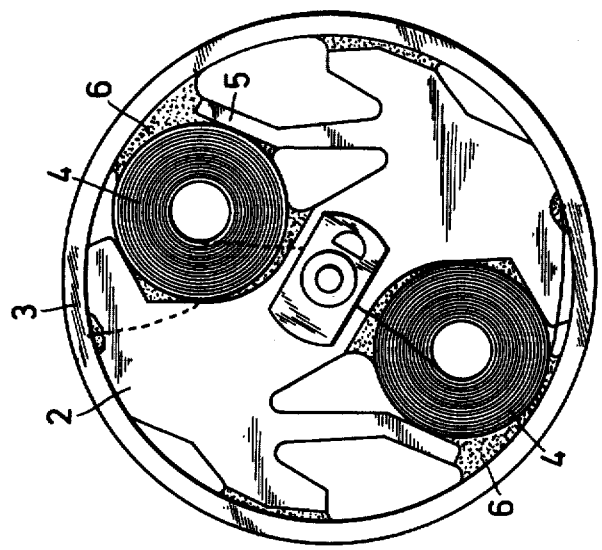
FIG. 1 illustrates semi-schematically the balance according to the invention in a top plan view.

FIGS. 1 and 2 relate to an oscillation system comprising a balance and a hair spring in which the balance carries two movable coils. The hair spring 18 is mounted in a conventional manner, i.e., one end is connected to the balance shaft 1 and the other end is secured to the watch frame (not shown). In the embodiment of FIG. 2, two such hair springs are used, as current flows via the two hair springs to and from the two coils. The balance assembly itself comprises a shaft 1, the shaft being journalled in known manner in jeweled bearings or the like mounted on the watch frame. A hub member or coil carrier 2 is rigidly connected to shaft 1 and symmetrical therewith. A ring or annulus 3 is disposed about the periphery of hub member 2 and retentively engages the hub member. Coils 4 are mounted to the carrier 2 by means of resilient fingers 5 and epoxy resin 6. The coils are connected in series, contact being made via a wire terminal 7 to shaft 1 and via wire terminal 8 to the roller 9 which is mounted on shaft 1, care being taken that shaft 1 and roller 9 are electrically insulated. The other wire terminals 10 of coils 4 are shorted by annulus 3 and this is provided in that these terminals are clamped between the carrier 2 and annulus 3; carrier 2 consisting of electrically insulating material while annulus 3 being made of metal. In operation, the shaft 1, carrying the hub 2 and associated annulus 3, oscillates about its axis with the coils 4 oscillating between fixed magnets 20 secured to the watch frame.

FIGS. 3 and 4 illustrate that in order to assemble the hub body and annulus the latter is acted upon by mechanical forces 11 in direction of the arrows so that the annulus is deformed in a generally oval shape, provided that this deformation does not exceed the limit of elasticity of the annulus material. While annulus 3 is so deformed and is preferably held in abutment by forces in the direction of arrow 12 against a support 13, the preassembled portion of the balance comprising carrier 2 and coils 4 may be inserted into the annulus. The shaft 1 preferably is held perpendicularly by clamping means indicated at 14 after said inserting step. The wire ends 10 may now be positioned between portion 15 of carrier 2 and annulus 3, portion 15 being concentric with respect to the balance center. After removal of the forces 11 the annulus 3 will tend to assume again its original circular shape thereby being urged onto the carrier 2. Furthermore the wire terminals 10 are intimately contacted with annulus 3 so that the latter forms an electrically conductive junction of both coils 4 in series connection.

By slowly releasing the tension, annulus 3 is positioned on the hub body accurately in such a manner which corresponds to the orientation of shaft 1 with respect to plane 13. As long as shaft 1 is positioned perpendicularly with respect to plane 13 by clamping means 14, the annulus 3, also, is positioned perpendicularly with respect to shaft 1 and thus in a flat manner. Care must be taken that the forces 11 are removed uniformly in order to position annulus 3 symmetrically with respect to carrier 2 thereby avoiding imbalance due to excentric positioning of annulus 3 in direction of forces 11. Imbalances due to differences in weight or inaccurate positioning and shape tolerances of coils 4 or coil carrier 2 may readily be compensated at the ready balance by removing material at desired points of annulus 3. In order to provide safe fixing of annulus 3 on carrier 2 the annulus may be provided with an inner diameter somewhat smaller than the distance by which the two abutting surface 15 of carrier 2 are spaced so to provide a sufficient bias.

Since the carrier 2 consists of electrically insulating material the coils 4 may be positioned by means of resilient fingers 5 of the carrier 2 which urge the coils 4 against the V-shaped indentations 17. In order to assemble these elements the resilient fingers 5 may be deflected by means of forces applied at 16 so that the coils can be inserted without any difficulty. After release of the fingers 5, coils 4 and annulus 3 as shown in FIGS. 1 and 2 may be secured by means of epoxy resin.

What I claim is:

1. A balance assembly for an electric watch comprising a shaft oscillatory about its axis, a hub member formed of an electrically insulating material rigidly connected to and symmetrical with said shaft, electromagnetic means mounted to said hub member and a metallic, electrically conducting ring member coaxial with said shaft and peripherally disposed about said hub member and in engaging retentive relationship therewith.

2. The balance assembly of claim 1 wherein said electromagnetic means comprises a coil having two terminal wires, one of said terminal wires being connected to the shaft and the other of said terminal wires being clamped between the hub member and the ring member.

3. The balance assembly of claim 1 wherein said electromagnetic means comprises two coils connected in series, each of said coils having two terminal wires, one of said terminal wires of each coil being connected to the shaft and the other of said terminal wires of each coil being clamped between the hub member and the ring member.

4. The balance assembly of claim 1 wherein said hub member is formed of a heat-settable plastic material.

5. A method of assembling a balance assembly of an electric watch, said balance assembly comprising an electrically insulated hub member, having electromagnetic means mounted thereon, said hub member being rigidly connected to and symmetrical with a shaft member, said hub member being disposed within and in retentive engagement with a peripheral, metallic, electrically conducting ring, said method comprising the steps of:
 a. applying radially acting forces to said ring member to elastically deform the ring member to a generally oval shape;
 b. positioning said hub member and associated shaft member within the area defined by said elastically deformed ring member, the shaft member being aligned perpendicular to the horizontal plane of the ring member;
 c. removing said radially acting forces whereby said ring member returns to its circular shape and peripherally engages and retains said hub member; and
 d. balancing said assembly by removing mass from the metallic ring to compensate for the contribution of the elements comprising the balance assembly to the moment of inertia thereof.

6. The method of claim 5 wherein said electromagnetic means mounted on said hub member comprises a coil having two terminal wires, said method including the further steps of connecting one of said terminal wires to the shaft and positioning the other of said terminal wires between the hub member and the ring member prior to removing the radially acting forces from said ring member, whereby upon removal of said forces, said other terminal wire is clamped between the hub member and the ring member.

7. The method of claim 5 wherein said electromagnetic means mounted on said hub member comprises two coils connected in series, each of said coils having two terminal wires, said method comprising the further steps of connecting one of said terminal wires of each coil to the shaft and positioning the other of said terminal wires of each coil between the hub member and the ring member prior to removing the radially acting forces, whereby upon removal of said forces, said other terminal wires are clamped between the hub member and the ring member.

* * * * *